United States Patent [19]

Kawasaki et al.

[11] Patent Number: 4,477,161
[45] Date of Patent: Oct. 16, 1984

[54] COMPENSATOR SYSTEM FOR DIAPHRAGM CONTROL IN A SINGLE-LENS REFLEX CAMERA OF INTERCHANGEABLE LENS TYPE

[75] Inventors: Masahiro Kawasaki, Tokyo; Zenichi Okura, Ichikawa; Fumio Urano, Omiya, all of Japan

[73] Assignee: Asahi Kogaku Kogyo Kabushiki Kaisha, Tokyo, Japan

[21] Appl. No.: 229,879

[22] Filed: Jan. 30, 1981

[30] Foreign Application Priority Data

Jan. 31, 1980 [JP] Japan .................................. 55-10978

[51] Int. Cl.$^3$ ............................................. G03B 7/085
[52] U.S. Cl. .................. 354/448; 354/271.1; 354/286; 354/455
[58] Field of Search ................... 354/46, 286, 271, 43

[56] References Cited

U.S. PATENT DOCUMENTS

| | | | |
|---|---|---|---|
| 3,486,434 | 12/1969 | Suzuki et al. | 354/46 X |
| 4,146,317 | 3/1979 | Date et al. | 354/271 X |
| 4,168,892 | 9/1979 | Ueda et al. | 354/286 X |
| 4,245,901 | 1/1981 | Karikawa et al. | 354/43 |
| 4,275,953 | 6/1981 | Watanabe et al. | 354/286 X |

Primary Examiner—Michael L. Gellner
Attorney, Agent, or Firm—Christie, Parker & Hale

[57] ABSTRACT

A compensator system for diaphragm control in a single-lens reflex camera of interchangeable type having an exposure control circuit responsive to the position of a lever that is operatively coupled to the diaphragm according to a preset position of a diaphragm preset ring. The exposure control circuit is regulated for compensating any errors in illumination intensity in a film plane provided by individual interchangeable lenses and errors in illumination intensity provided by photometric operation through respective lenses mounted on a camera in relation with a specific position of a light receiving element contained in a photometric circuit. A diaphragm preset ring has on the periphery thereof an indication for the automatic diaphragm control at a predetermined angular distance from an indication for the fully closed diaphragm value of an associated lens. An arithmetic factor is provided for exposure control comprising an electric adjustment factor such as a resistance value or binary signal that is selected by the lever when the diaphragm preset ring has been rotated to the automatic diaphragm control position. A signal is provided for detecting a fully closed diaphragm and a fully opened diaphragm. Compensation is provided for a deviation from the signal representing the fully opened diaphragm value not represented by any of the specific series of a multiple of a first displacement provided by a diaphragm blade actuator system.

6 Claims, 6 Drawing Figures

COMPENSATOR SYSTEM FOR DIAPHRAGM CONTROL IN A SINGLE-LENS REFLEX CAMERA OF INTERCHANGEABLE LENS TYPE

BACKGROUND OF THE INVENTION

It is known for the single-lens reflex camera using interchangeable lens that, when photometric operation is done within the camera through an interchangeably mounted lens with the diaphragm of said lens being fully opened (so-called TTL photometry with fully opened diaphragm), using a resultant value by directly coupling it with an exposure meter or subjecting said value to an automatic exposure control operation would lead to a significant error between an exposure value to be set and said photometric value so that a photographing result with a proper exposure would not be obtained.

Such deviation or error is largely classified into the one due to optical characteristics of individual lenses interchangeably mounted on camera and the one due to specific position at which a light receiving element is located within the camera. The former is caused by a fact that the lens aperture stopped down by a diaphragm adapted to be preset by a diaphragm preset ring at a moment of photographing cannot produce an accurate multiple proportional variation of actual illumination intensity in the film plane corresponding to a multiple proportional variational variation of preset diaphragm value marked around the diaphragm preset ring. More specifically, individual interchangeable lenses are different in their lens materials, lens arrangements and assemblying modes, so that the illumination intensity in the film plane depends upon a light transmissivity characteristics, a vignetting effect peculiar to each lens, and particularly so-called aperture eclipse occurring with the fully opened diaphragm which substantially reduces the effective illumination intensity in the film plane when the lens aperture is held close to its fully opened diaphragm value. In consequence, the illumination intensity in the film plane is reduced in its effective value and varies in a mode far from said multiple proportional variation as the lens aperture approaches to the fully opened diaphragm value while the illumination intensity which is practically uniform and multiple proportionally varies substantially corresponding to the successive steps of preset values marked around the periphery of the diaphragm preset ring can be obtained within a range of relatively small lens aperture values, for example, less than a F-value of 5.6. Effective value of the illumination intensity in the film plane is substantially reduced at the fully opened diaphragm (the maximum lens aperture) and a resultant value of photometric operation carried out at this fully opened diaphragm cannot be utilized to obtain a proper exposure, since it would be impossible, from this resultant value, to produce a multiple proportional variation of exposure exactly or acceptably corresponding to the multiple proportional variation of successive preset values within the range of relatively small lens apertures and thereby to obtain an exposure time corresponding to a preset diaphragm value. Such error appearing in the film plane due to variation of illumination intensity depending upon individual interchangeable objectives is referred to herein as the illumination intensity error in the film plane.

The photometric element exposed to the light coming through the lens with fully opened diaphragm is preferably located just in the film plane so that said photometric element may be operatively coupled to an exposure meter or utilized for automatic exposure control to obtain a proper exposure. However, if photometric operation is actually performed just in the film plane, the photometric element would be a critical obstacle for film exposure in photographing and it would possibly lead to a solution that the photometric element is located not in the film plane itself but at a position which is equivalent to said film plane or causes little photometric deviation from the value which would be obtained from the photometric operation performed just in the film plane. Such photometric position equivalent to the film plane may be, for example, a position of a focussing plate on which the light reflected by a mirror is focussed and this position is, in fact, preferred in that this position is in a conjugate relationship with the film plane. However, this position would be an obstacle not only for the user's view through a viewfinder but also for the user's focus adjusting operation. Accordingly, the photometric element has usually been located, in most cases, on the light exit end surface of a pentagonal-dachkant-prism or similar optical system for reflection and inversion of light which is mounted on the focussing plate, particularly along the periphery of a viewfinder eyepiece so that a viewing therethrough should not be prevented. Even such position of the photometric element has been encountered by a problem that a photometric result is obtained as a value slightly lower or darker than the illumination intensity actually given in the film plane, since the position of the photometric element is deeper than the position of the focussing plate which is practically equivalent and conjugate to the film plane by a length of the optical reflection and inversion path defined by said prism and there occurs much or less light absorption by said prism. It will be obvious that such location of the photometric element has never achieved the intended photometric effect exactly equivalent to that obtained from the photometric operation performed just in the film plane and necessarily subjected to an error depending upon a focal distance of each interchangeably mounted lens. The error of this type is referred to herein as the illumination intensity error due to the position of the photometric element.

Thus, the respective errors as above mentioned inevitably appear as various quantities of deviation from the actual photometric values which should be obtained through the fully opened diaphragms no matter whether the objectives have the same value of their fully opened diaphragms or the same focal distance. (Details of these errors are illustrated and described in the specification of U.S. Pat. No. 3,486,434.)

With the photographic camera of so-called diaphragm regulation priority type, it is usual to transmit an information signal corresponding to a preset diaphragm value from the lens to a photometric instrument or its associated circuit or an exposure control circuit in the camera body by suitable mechanical means such as a cam (an example of such means is disclosed in Japanese Patent Publication No. 53(1978)-33064) or by suitable electrical compensator means such as a variable resistor control of special arrangement depending upon a diaphragm value actually preset so that the exposure control of high precision can be achieved with an effective compensation of the errors as mentioned above and thereby a proper exposure is given.

An object of the present invention is to provide a novel automatic diaphragm control system by which various error quantities of the previously mentioned two categories depending upon different objectives interchangeably mounted on cameras are effectively compensated and operation of stopping down is effected from the camera body to give a proper exposure.

SUMMARY OF THE INVENTION

Briefly, the invention contemplates a compensator system for diaphragm control in a single-lens reflex camera of the interchangeable lens type. The camera includes a diaphragm preset ring moveable between fully opened and automatic diaphragm control positions. The diaphragm has blades moveable through a series of multiples of a first displacement of the blades. An actuator system drives the diaphragm blades to a desired position through the series of multiples of a first displacement of the blades. The camera includes a photometric circuit comprising a light receiving element and a film plane defined within the camera.

An exposure control circuit is provided for controlling the exposure of film in the film plane. The exposure control circuit is responsive to the position of a lever that is operatively coupled to the diaphragm according to a preset position of the diaphragm preset ring. Means are provided for regulating the exposure circuit for compensating any errors in the illumination intensity in the film plane provided by individual interchangeable lenses and errors in illumination intensity provided by photometric operation through the respective lenses mounted on the camera in relation with the specific position of the light receiving element. The diaphragm preset ring has on the periphery thereof an indication for indicating the automatic diaphragm controlled at a predetermined angular distance from an indication for the fully closed diaphragm value of an associated lens.

Means are provided for inputting an arithmetic factor for exposure control comprising an electric adjustment factor selected by said lever operatively associated with the diaphragm when said diaphragm preset ring has been rotated to the automatic diaphragm control position.

Preferably, the electronic adjustment factor is a resistance value or a binary signal.

Means are also provided for detecting a fully closed diaphragm value signal corresponding to an associated lens. Additionally, means are provided for detecting a fully opened diaphragm value signal corresponding to an associated lens and for compensating for a deviation from the signal representing the fully opened diaphragm value not represented by any of the specific series of multiples of a first displacement provided by the actuator system.

DETAILED DESCRIPTION

Figure 1:
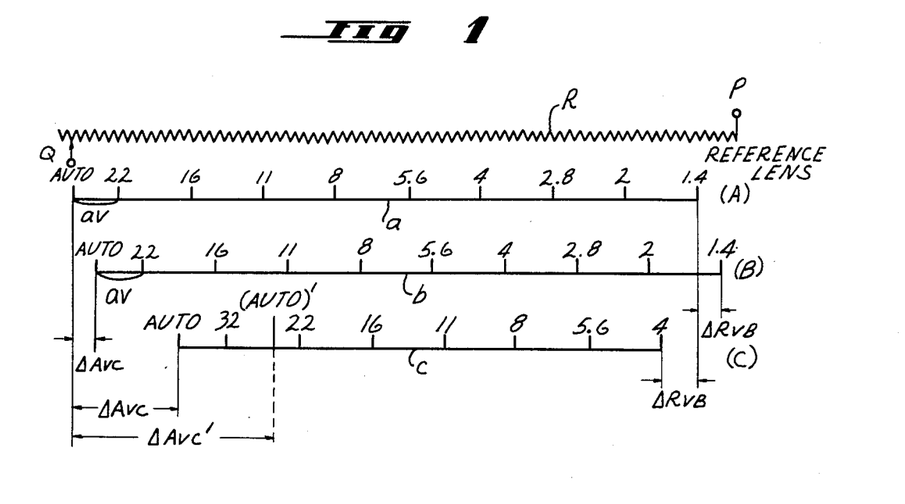
FIG. 1 illustrates schematically a principle of the present invention particularly concerning a relationship between a resistance value selected by a lever operatively associated with a diaphragm preset ring of respective interchangeable lenses on a variable resistor and a starting point from which said preset ring is rotated.

Prior to describing the construction of the present invention in detail, procedures for compensation of said errors will be considered with respect to the photographic camera of diaphragm adjustment priority type and the compensator means according to the present invention will be described along these procedures for better comprehension. Referring to FIG. 1, R designates a variable resistor, provided in a conventional camera body (not shown), having a resistance value that is selectively set typically by a conventional lever operatively associated with a diaphragm preset ring of a respective objective interchangeably mounted on the camera. Specifically, a resistance value of the variable resistor R peculiar to a given preset diaphragm value is set as said diaphragm preset ring is rotated to a given preset diaphragm value. Even when one objective has the same fully opened diaphragm value as another objective, the respective effective values of illumination intensity in a film plane defined within the camera may be different from each other at their fully opened diaphragm values so far as they are different in their lens arrangements of other aspects. When lenses have the same fully opened diaphragm values but differ in their focal distances, there occurs, in addition to a variation of the illumination intensity error in the film plane, a variation of the illumination intensity error due to the position of a photometric element used to detect such illumination intensity. As a result, the resistance value of the variable resistor R selected by the lever of each objective at the fully opened diaphragm value should be peculiar to such objective.

In view of the fact that the objectives interchangeably mounted in the camera may have the same fully opened diaphragm values and their focal distances but differ in their lens arrangements, or the same in their focal distances but differ in their fully opened diaphragm values, or the same in their fully opened diaphragm values but differ in their focal distances, and so on, one objective which is considered a standard is chosen as the reference lens on the basis of which all the other different objectives are subjected to a desired compensation so that the levers operatively associated with the diaphragm preset rings of the respective interchangeable objectives may select proper resistance values at their fully opened diaphragm values. it is obvious that, also with such reference lens (hereinafter referred to as the reference lens A, the effective illumination intensity in the film plane is lower than the level according to the associated nominal diaphragm value so far as the fully opened diaphragm value or a range of values adjacent thereto is concerned while a series of multiple proportional diaphragm values within a range of relatively small diaphragm values bring about substantially multiple proportional variation of illumination intensity in the film plane. Obviously, the photometric element is influenced not only by such general characteristics but also by the illumination intensity error due to the position of the photometric element.

Based on the illumination intensity error in the film plane and the illumination intensity error due to the position of the photometric element determined with respect to the reference lens A (for example, having a fully opened diaphragm value of F 1.4), the lever operatively associated with the diaphragm of this reference lens A may be adapted to be driven and positioned so that respective preset diaphragm values corresponding to regular interval graduations on the diaphragm preset ring which are representative of multiple proportional diaphragm values result in proper selection of respective resistance values. Such resistance values may be utilized for arithmetic operation of a photometric circuit of the automatic exposure control circuit type, providing a relative position relationship between the variable resistor R in the camera body of which the resistance value is selected by the lever operatively associated with the diaphragm value preset ring of the reference lens A as a given diaphragm value is preset on the one hand, and the diaphragm preset ring a adapted to drive (indicated by corresponding dashed line in FIG. 1) said lever operatively associated with the diaphragm value preset ring on the other hand as illustrated by (A) of FIG. 1. Relative to this position relationship, a lens B being the same in its fully opened diaphragm value F 1.4 as lens A but different in the other aspects has its diaphragm preset ring b positioned as illustrated by (B) of FIG. 1 and further another lens C having a fully opened diaphragm value F 4 smaller than those of said lenses A and B has its diaphragm value preset ring c positioned as illustrated by (C) of FIG. 1. It should be noted here that the position relationship has been illustrated in FIG. 1 as the relative positions of the respective diaphragm values of preset ring when the diaphragm values of the respective lenses are preset to their fully opened diaphragm values to facilitate understanding of the various features of the present invention which will be described later.

By adjustably rotating the diaphragm preset ring of the respective lenses A, B and C from such relative position relationship, both the illumination intensity error in the film plane and the illumination intensity error due to the position of the photometric element are so effectively compensated that not only a photometric signal corresponding to the actual illumination intensity in the film plane produced through the fully opened diaphragm is transmitted to an arithmetic section of the photometric circuit or the exposure control circuit but also a given diaphragm value preset by rotating the diaphragm preset ring from the respective original position properly brings about a corresponding multiple-proportional value of exposure.

Such method of error compensation falls under a classification in which the information regarding diaphragm value applied to the arithmetic section of the exposure control circuit according to the diaphragm value priority mode is replaced by a resistance value selected by a given preset diaphragm value. This method of error compensation can be adapted for the exposure time priority mode in which an exposure time is set with priority and then the objective is stopped down to a diaphragm value corresponding to a resistance value which will give a proper exposure. The resistance value given as a result of such stopping down already includes an effective compensation of both the illumination intensity error in the film plane and the illumination intensity error due to the position of the photometric element and, accordingly, this resistance value may be utilized as an arithmetic factor for automatic exposure regulation to regulate a quantity of actuation for automatic diaphragm control. On the assumption that the same diaphragm preset ring as used for the diaphragm priority mode is utilized, a preset position for automatic diaphragm control is selected on said diaphragm preset ring at a predetermined angular or rotational distance (corresponding to $a_v$ as illustrated in FIG. 1 and in this case $a_v \geq 0$) from the rotational position for the fully closed diaphragm value so that both the illumination intensity error in the film plane and the illumination intensity error due to the position of the photometric element may be effectively incorporated in the operation of "stopping down" through the F values. Such preset position for automatic diaphragm control depends upon individual interchangeable objectives as illustrated in FIG. 1, in which the diaphragm preset ring a of the reference lens A has its automatic diaphragm control marking (Auto) at an angular distance $a_v$ from the marking of the fully closed diaphragm value F 22 while the diaphragm preset ring b of the lens B which has the same fully opened diaphragm value and fully closed diaphragm value as the reference lens A bears thereon its peculiar preset position for automatic diaphragm control (Auto) at an angular distance $\Delta AvB$ from the corresponding position for the reference lens A. Similarly, the diaphragm preset ring c of the lens C has its peculiar preset position (Auto) for automatic diaphragm control at an angular distance $\{AvC$ from the corresponding preset position for the reference lens A when the fully closed diaphragm value is at F 32 and at an angular distance $\Delta Av'C$ when the fully closed diaphragm value of lens C is at KF 22. As will be readily understood, these angular distances or deviations or $\Delta Av$ in general are determined depending not only upon the deviations ($-\Delta RvB$ for the lens B and $\Delta RvC$ for the lens C) due to different points of starting the operation which are, in turn, determined by different fully opened diaphragms and other characteristics peculiar to the respective objectives interchangeably mounted on the camera but also upon the different fully closed diaphragm values marked on the respective diaphragm preset rings. Thus, the resistance value actually used for the arithmetic operation is selectively obtained between the points P and Q of the variable resistor R.

In this connection, reference is made to Suzuki et al U.S. Pat. No. 3,486,434, which issued Dec. 30, 1969. The disclosure of this patent is incorporated fully herein by reference. Point or terminal Q of the variable resistor R is adjusted by a diaphragm index member on each particular lens in the manner depicted in the Suzuki et al patent as such lens is installed in the camera body. The position of the index member on each lens establishes the $\Delta Av$ value therefor.

From the basic concept as mentioned above, an arithmetic expression established when the diaphragm preset ring has been set to the automatic diaphragm control position (Auto) will be considered. This expression is given in the following form according to the exposure time regulation priority mode (or the shutter priority mode), and all the units are represented by EV values.

$$Av = Bv' + Sv - Tv + \Delta Av - \Delta Amin + 1 \qquad \text{equation 1.1}$$

wherein:
Av: diaphragm value;

Bv': brightness value of object to be photographed after transmission through the objective;

Sv: sensitivity value of film used for photographing;

Tv: shutter speed value set with priority;

$\Delta Av$: deviation from reference lens A;

$\Delta Amin$: a difference between the fully closed diaphragm value of the reference lens A and the fully closed diaphragm value of each lens interchangeably mounted on the camera; with respect to the fully closed diaphragm value F 22 of the reference lens A, as illustrated by FIG. 1, $\Delta Amin = 0$ when the lens to be mounted on the camera has a fully closed diaphragm value of F 22 while $\Delta Amin = -1$ when the lens to be mounted on the camera has a fully closed diaphragm value of F 32, and such information is transmitted from the lens to the arithmetic circuit in the camera body simultaneously as the deviation or difference signal when the lens is interchanged. (1 is the EV value given relative to the fully opened diaphragm value F 1.4 of the reference lens A).

The diaphragm value Av obtained by equation 1.1 has already been incorporated with compensation of the illumination intensity error in the film plane and the illumination intensity due to the position of the photometric element. In the case in which the diaphragm value is preset by rotation of the diaphragm preset ring in the diaphragm value priority mode, instead of relying upon the automatic diaphragm control (Auto), the shutter speed can be obtained by mutually interchanging the terms Av and Tv in equation 1.1 namely:

$$Tv = Bv' + Sv - Av + \Delta Av - \Delta Amin + 1 \qquad \text{equation 1.2}$$

The exposure control and its value may then be used for display within a viewfinder.

Operation of the automatic diaphragm control is accomplished when a member provided in the camera body operatively associated with the shutter release drives a release plate on the lens and thereupon the release plate is displaced from a position at which the diaphragm mechanism is held fully opened to a position at which said diaphragm mechanism reaches a given EV value. A displacement quantity of said release plate is in a linear proportion to a quantity of stopping down and, therefore, the Av value obtained from said equation 1.1 cannot be directly utilized as a control value for the diaphragm. When a value, for example, Av=5(F 5.6) is used as the arithmetic operation value for the diaphragm control, stopping down by a quantity of 4 EV results in stopping down to F 5.6 so far as an objective having its fully opened diaphragm value of F 1.4(Av=1) while stopping down by a quantity of 1 EV results in stopping down to F 5.6(Av=5) so far as an objective having its fully opened diaphragm value of F 4(Av=4). Thus, the EV quantity necessary for a desired quantity of stopping down is obtained in the form of a difference or deviation between the EV value as a result of arithmetic operation and the fully opened diaphragm expressed in EV value and a control quantity Pv expressed in EV value as the control quantity is given by the following formula:

$$Pv = Bv' + Sv - Tv + \Delta Amin + 1 - Amax = AV - Amax \qquad \text{equation 1.3}$$

wherein:

Amax represents the EV value at the fully opened diaphragm depending upon individual lenses interchanged.

It will be obvious from the above formula that Pv expressed in EV value as the control quantity depends upon the fully opened diaphragm values of the respective lenses which determine a precision of said control quantity Pv. Accordingly, when a particular lens is mounted on the camera it is required to transmit the fully opened diaphragm value peculiar to the lens from the lens to the camera body as a signal which identifies this lens.

Figure 2:
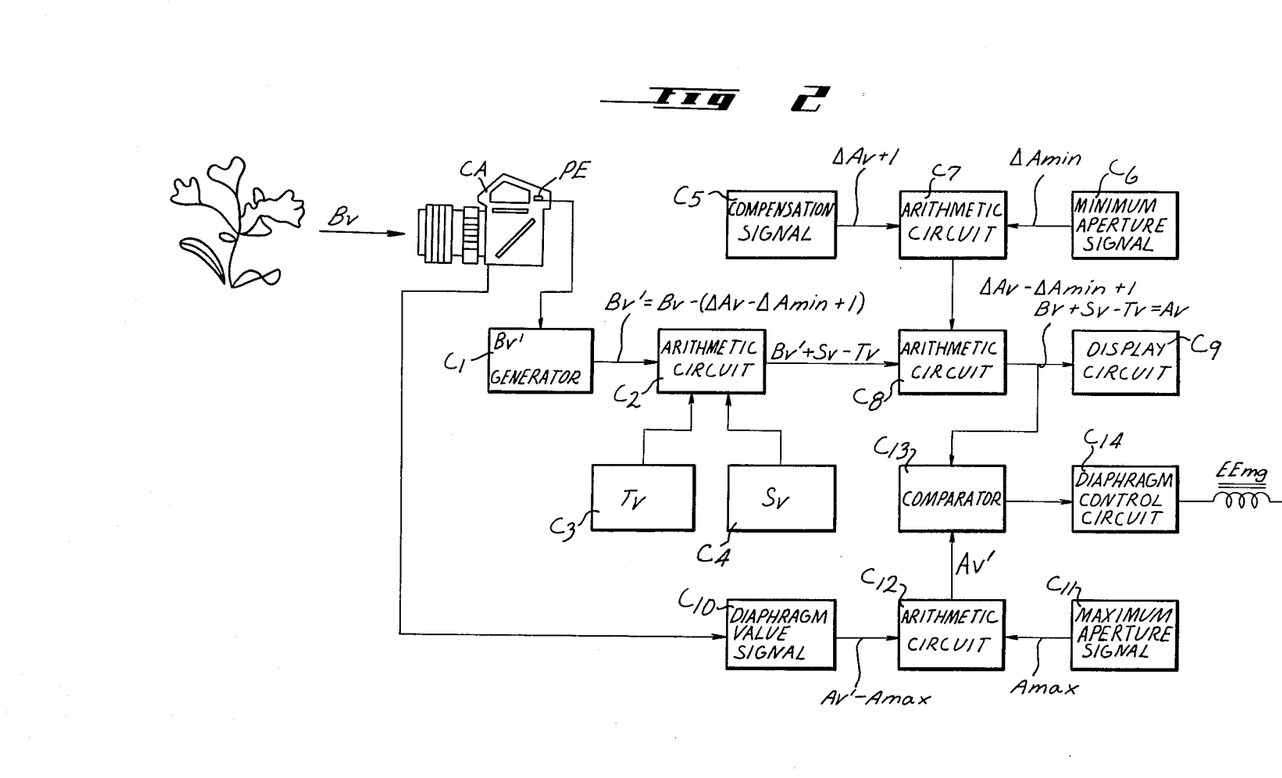
FIG. 2 is a block diagram illustrating schematically an automatic diaphragm control circuit according to the present invention.

An example of the single-lens reflex camera in which the automatic diaphragm control is effected according to such arithmetic formula is illustrated by FIG. 2, wherein CA designates a camera and Bv designates a brightness of an object to be photographed. It has previously been mentioned that a light quantity coming from the object having its brightness Bv through the objective and to which a photometric element PE is exposed takes an inherent value depending upon a fully opened aperture of this lens, a light absorption coefficient, and internal reflection and vignetting effect of this lens, and other factors. An output provided by the photometric element PE is log-compressed by a conventional log-compression generator identified as Bv' generator $C_1$. The output of generator $C_1$ is in the form of:

$$Bv' = Bv - (\Delta Av - \Delta Amin + 1) \qquad \text{equation 2.1}$$

and then is applied to a conventional arithmetic circuit $C_2$ which is also applied with an information signal Tv based on the exposure time (shutter speed) set with priority and another information signal Sv based on the sensitivity of the film in use from a shutter speed regulating member $C_3$ and a film sensitivity regulating member $C_4$, respectively. Thus, the arithmetic circuit $C_2$ provides a resultant information signal as follows:

$$Bv' + Sv - Tv \qquad \text{equation 2.2}$$

When an interchangeable lens is mounted on the camera CA and its diaphragm preset ring is rotated to the automatic diaphragm control position (Auto), a value $\Delta Av$ peculiar to this lens aand a constant value 1 are added thereto through a circuit processing is a signal:

$$\Delta Av + 1 \qquad \text{equation 2.3}$$

which is the output of compensation signal member $C_5$ and the input to a conventional arithmetic circuit $C_7$. The arithmetic circuit $C_7$ is supplied with an information signal:

$$\Delta Amin \qquad \text{equation 2.4}$$

which corresponds to a deviation of a fully closed diaphragm value peculiar to this lens from the fully closed diaphragm value of the reference lens A from a minimum aperture signal member $C_6$. As a result, the arithmetic circuit $C_7$ provides a resultant output:

$$\Delta Av - \Delta Amin + 1 \qquad \text{equation 2.5}$$

This output is applied together with the output expressed by the equation 2.2 coming from said arithmetic circuit $C_2$ to a conventional arithmetic circuit $C_8$ in which an arithmetic operation of adding equation 2.2 to 2.5 is performed, i.e., $$Bv'Sv - Tv + \Delta Av - \Delta Amin + 1 = Av$$

Substitution of Bv′ from the equation 2.1 gives:

$$Bv+Sv-Tv=Av \qquad \text{equation 2.6}$$

and thus it is possible to obtain an Apex quantity Av of the diaphragm value.

Such Av value can be displayed within a viewfinder by a conventional display circuit $C_9$ consisting, for example, of an appropriate meter. The information signal Av subjected to this display merely indicates a diaphragm value providing a proper exposure with respect to the exposure time (shutter speed) set with priority but not the automatic control quantity as it has previously been mentioned. To effect stopping down with the automatic diaphragm control quantity Pv in operation association with the operation of shutter release, a diaphragm value signal, i.e., $$Av'-Amax \qquad \text{equation 2.7}$$

provided from a diaphragm value signal generator member $C_{10}$ according to a diaphragm value of the lens and a fully opened diaphragm value signal, i.e., Amax provided from a fully opened diaphragm value signal generator member $C_{11}$ from the lens side to the camera body side when the lens is mounted on the camera $$Amax \qquad \text{equation 2.8}$$

are together applied to a conventional comparator arithmetic circuit $C_{12}$ to form Av′. The resultant signal output Av′ is then applied to a conventional comparator circuit $C_{13}$ in which the signal output Av′ is compared with an output Av provided from arithmetic circuit $C_8$ so that, when the output Av′ reaches said output Av, a corresponding signal output is applied to a diaphragm control circuit $C_{14}$, with which a diaphragm control magnet EEmg is released to control the diaphragm value to the Av value corresponding to said arithmetic result.

A voltage source is connected across variable resistor R and the signal ΔAv is the voltage between points Q and P of resistor R, which is the input to compensation signal member $C_5$.

Minimum aperture signal member $C_6$ could comprise a voltage source and a resistor in the camera body connected through contacts discussed below in connection with FIG. 5 in series with a ΔAmin representative resistor in the particular lens. The minimum aperture signal is the voltage appearing across the ΔAmin representative resistor of the particular lens.

Fully opened diaphragm signal generator member $C_{11}$ could comprise a voltage source and a resistor in the camera body connected through contacts discussed below in connection with FIG. 5 in series with an Amax representative resistor in the particular lens.

Figure 6:
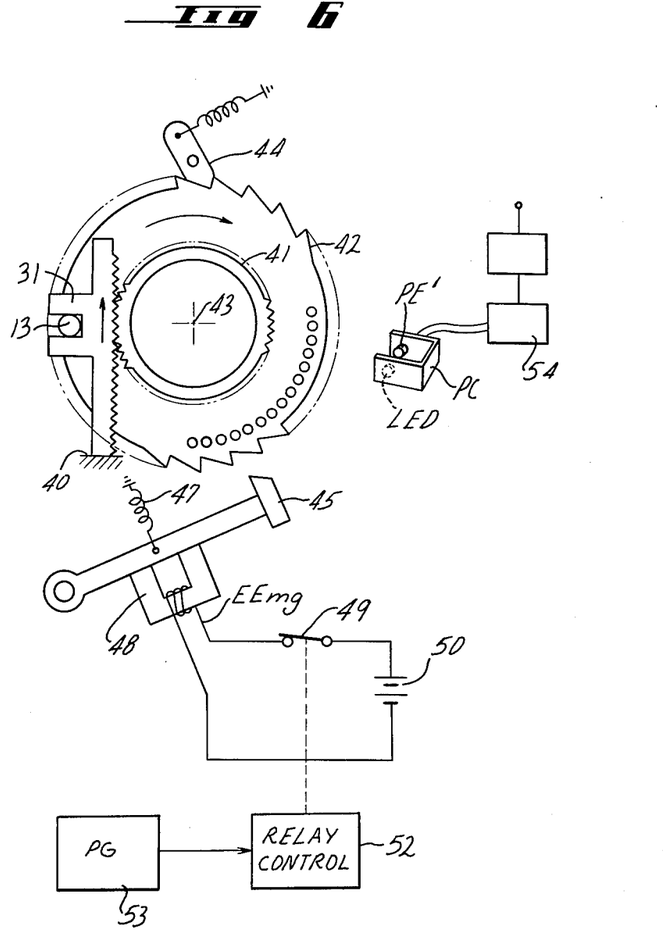
FIG. 6 is a diagram illustrating the present invention.

After the shutter release of the camera is actuated, the value of Bv′ produced by generator $C_1$ remains fixed for the rest of the automatic exposure control operation. Thus, generator $C_1$ produces a static signal. Diaphragm value signal is input by a photo-coupler which consists of an LED and a PE′ (another photometric clement, not the same as PE) as shown in FIG. 6. The number of pulse from PE′ is in proportion to Av′−Amax. During the automatic exposure control operation, while the inputs to comparator $C_{13}$ differ, the diaphragm stops down from its maximum value responsive to diaphragm control magnet EEmg. When the inputs to comparator $C_{13}$ are equal, a stop signal is generated to fix the diaphragm value.

Now the lens to be mounted on the camera will be considered. The fully opened diaphragm value (maximum lens aperture) is not always covered by a series of multiple proportional brightnesses but there may be lenses having F values such as F 1.8, F 1.9 and F 2.5. Certainly the Pv value as said control quantity could principally be maintained as the exact value when the fully opened diaphragm values deviating from said series of multiple proportional brightnesses are transmitted exactly as signals peculiar to the respective lenses from the lens to the camera body. However, incorporation into a product of such a concept that the lens characterizing signal deviating from a series of multiple proportional brightnesses also is transmitted from the lens to the camera body would inconveniently result in an extremely complicated design of the camera and increase the fabrication cost. In consequence, these information signals would be transmitted only in approximate values by a series of at most ½ EV(0.5 EV) step divided information signals, for example, F 1.2, F 1.4, F 1.7, F 2.... With such approximating processing, relatively small quantities of deviation would not practically affect the precision, but the fully opened diaphragm values not covered even by this ½ step series, such as F 1.8 and F 2.5 would result in deviations from the transmitted Amax signals too great to bring about acceptable automatic control diaphragm values.

Generally, the objective preferably has a large value of its fully opened diaphragm to be used for photograhing, since it provides a viewfinder image sufficiently bright to detect an exact focussed point during focus adjustment and enlarges a range of stopping down and thereby enlarges the exposure range that can be photographed. However, this preferable condition is adversely limited by the requirement for various aspects such as optical characteristics and lens size. Thus, it will be practically difficult and even disadvantageous to extract Amax signals exactly according to equation 1.3 with respect to all the interchangeable lenses over a wide variety and then to transmit them to the camera body in view of factors such as a space for incorporation, a cost therefor and a reliability in operation.

To overcome such problem, the present invention contemplates that an error in the automatic diaphragm control due to the differences of the fully opened diaphragm values is compensated by a special operation of the member taking part in the diaphragm control, namely, the diaphragm driving member in the camera body or a member operatively associated therewith to bring the diaphragm mechanism to a position corresponding to the desired diaphragm value.

The term "a special operation" used herein means the part in the course of operation of an operative system starting from said diaphragm driving member in the camera body and terminating in the diaphragm blades that directly take no part in stopping said diaphragm blades down to the desired diahragm value. This operation taking no part directly in stopping down will be referred to hereinafter as a preliminary displacement and a quantity of displacement of the members constituting said operative system during said operation taking no part directly in stopping down, namely, before the operation for stopping down the diaphragm blades actually starts to stop the lens aperture down beyond the fully opened diaphragm to the desired value for control of the light quantity will be referred to hereinafter as a quantity of preliminary displacement.

Figure 3:
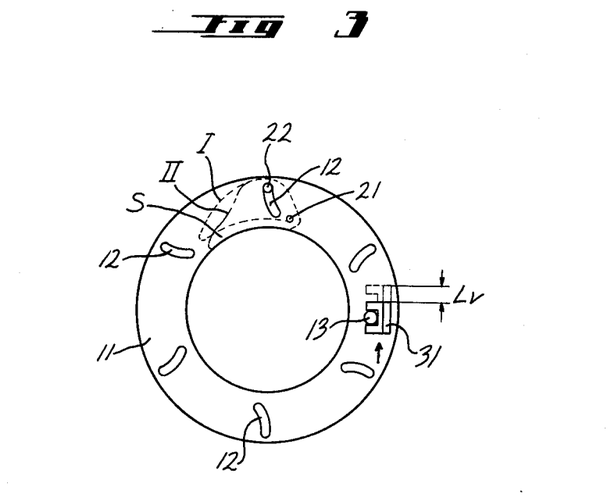
FIG. 3 is a rear elevation view illustrating an embodiment of a diaphragm mechanism in which a diaphragm driving system is provided with a preliminary displacement taking no part in light quantity control effect.

FIG. 3 illustrates by way of example an arrangement in which said preliminary displacement occurs in a part of the members constituting the operative system interposed between the diaphragm driving member in the camera body and the diaphragm blades on the lens before said diaphragm blades begin to be moved from the fully opened position to the desired stopped down position for control of light quantity.

Referring to FIG. 3, S designates one of diaphragm blades forming together an iris diaphragm and 11 designates a diaphragm blade actuating ring adapted to rotate a plurality of said diaphragm blades S around associated pivot pin 21. Said diaphragm blade actuating ring 11 is adapted to be rotated around the optical axis with respect to a stationary part of the lens barrel. Numeral 12 designates a plurality of cam grooves formed in said diaphragm blade actuating ring 11 into which associated driven pin 22 planted on the respective diaphragm blades S are engaged. The diaphragm blade actuating ring 11 is also provided with a fixed pin 13 adapted to be engaged with a release plate 31 which is, in turn, driven by the diaphragm driving member actuated in the camera body in operative association with the operation of shutter release. The diaphragm blade actuating ring 11 is potentially biased by a spring in the direction opposed to the direction indicated by an arrow in FIG. 3 so that said diaphragm blade actuating ring 11 normally tends to open the iris diaphragm towards its fully opened position. The position of the release plate 31 as illustrated corresponds to the starting position of this release plate 31, at which the respective diaphragm blades S take their positions I indicated by broken lines. Inner edge of each diaphragm blade S is situated inwardly of a circumferential opening which defines the maximum aperture of this lens. From these positions, the respective diaphragm blades S are rotated around the respective pivot pin 21 with its associated driven pin 22 being guided along the associated cam groove 12 as the release plate 31 is urged upward by the diaphragm driving member or a transmission member thereof in the direction indicated by the arrow and thereby the diaphragm blade actuating ring 11 is rotated via the pin 13, until the respective diaphragm blades S reach their positions II indicated by broken lines, at which their inner edges are brought into coincidence with said circumferential opening defining the maximum aperture of the lens. The positions II of respective blades S correspond to the positions of blades in the fully opened diaphragm. Further rotation of the diaphragm blade actuating ring 11 actually begins to stop the lens down beyond the said positions II of the respective diaphragm blades S. Thus, during movement from the positions I to the positions II, the respective diaphragm blades S have no function of incident light quantity control and operation of the release plate 31 takes no part in actual operation for stopping down. The operation of said release plate 31 from the starting position to the position illustrated by broken lines corresponds to the preliminary displacement which is an important feature of the present invention and a quantity of such displacement Lv is given as the quantity of preliminary displacement. Although this quantity of preliminary displacement occurs as a relative movement of the release plate 31 and the diaphragm blades S in the embodiment as illustrated in FIG. 3, this may be set as a relative movement between the diaphragm driving member in the camera body and said release plate 31.

As provided by equation 1.3, the value Amax has been described as the EV value based on the fully opened diaphragm value depending upon the individual lens interchangeably mounted on the camera. When such fully opened diaphragm value is given in accordance with a series of values stepped from every EV (for example, F 1.4, F 2, F 2.8, F 4 ...), deviations from said signal values stepped for every EV value occurring when the lenses, for example of said F 1.8 and F 2.5 which are not covered by this series of multiple proportional values are mounted on the camera can be compensated by the preliminary displacement quantity of said release plate 31. As an example, the lens having its fully opened diaphragm value of F 2.5 will have the EV value of 2.4 and the signal representing such fully opened diaphragm value transmitted from the lens to the camera body when this lens is mounted on the camera corresponds to 2 EV which is equal to the signal value transmitted when the lens having its fully opened diaphragm value of F 2 is mounted on the camera. Thus, an error corresponding to a deviation 0.4 EV is included in the signal value transmitted to the camera body. By constructing the interchangeable lens so that the release plate 31 has its preliminary displacement quantity increased by said quantity of error, it is possible to compensate the control quantity of diaphragm of the lens having its fully opened diaphragm value not covered by said series of multiple proportional values. Now the diaphragm control quantity Pv will be considered in connection with equation 1.3. If the arithmetic value =5 (stopped down to F 5.6), this lens will have Pv=5−2=3 when Amax=2 is transmitted from the lens to the camera body as this lens is mounted on the camera. The lens having its fully opened diaphragm value of F 2.5 should have its EV value of 2.4 and therefore the stopping down control quantity should be then given as Pv=5−2.4=2.6. Without any compensation, the lens would be excessively stopped down by a quantity corresponding to 0.4 EV. Simply by increasing the preliminary displacement quantity of the release plate 31 by an excess corresponding to 0.4 EV, the lens can be exactly stopped down to F 5.6 on the basis of said arithmetic value Av=5.

Figure 4:
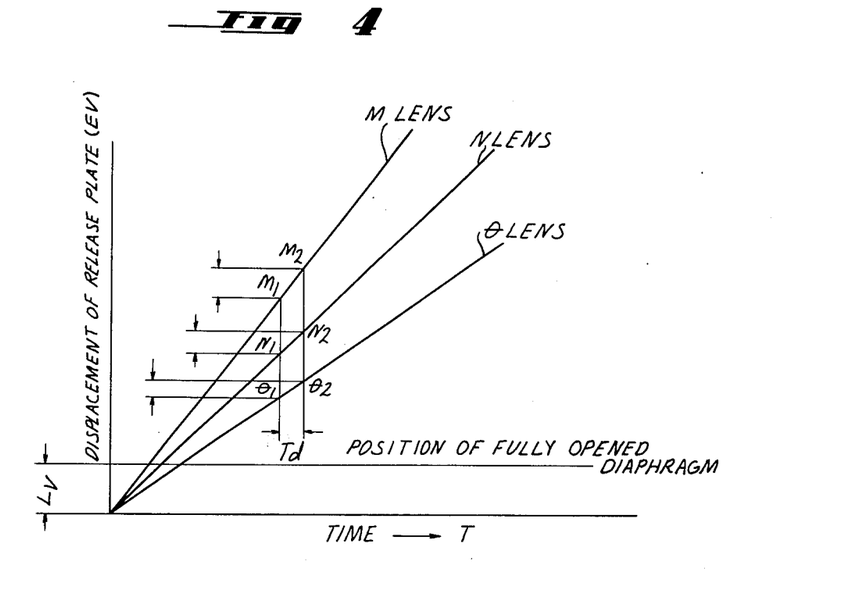
FIG. 4 is a characteristic diagram showing a delay appearing in operation of a mechanical system during a stopping down process.

As will be understood from the above explanation by way of example, even when the lenses, having their fully opened diaphragm values not covered by a particular series of multiple proportional values such as F 1.4, F 2, F 2.8, F 4 ... are mounted on the camera, the deviations from the maximum lens aperture signals transmitted by the lenses belonging to said series of multiple proportional values from the lens to the camera body can be effectively compensated by the preliminary displacement quantities for the actual operation of stopping down, so far as there occurs no mechanical operation lag in the mechanical system serving for stopping down. In practice, however, the problem of said mechanical operation lag often occurring in the mechanical system must be also considered in order to obtain the corresponding effective operation of stopping down for a proper exposure in the exposure time priority mode. FIG. 4 illustrates a diaphragm schematically showing such lag in the mechanical system. A displacement quantity of the release plate 31 is given in EV value by the axis of ordinate and a time required for stopping down is given by the axis of abscissa. When a relative linear relationship is given between the displacement quantity of the release plate 31 and the diaphragm value obtained from stopping down by said displacement quantity, variation in diaphragm values depending upon the displacement quantities of the release plate 31 is not always uniform due to various factors such as a biasing force of the spring normally striving to urge the diaphragm blades back to their fully opened positions, inertia and frictional loads of the respective operative members. Thus, the lenses are practically classified into three types, i.e., the high speed lens M, average lens N and low speed lens $\theta$. FIG. 4 shows the respective characteristic lines of these three types. Strictly, a variation of speed appears in movement of the release plate 31 itself during a period from start to stoppage thereof and particularly the release plate 31 moves at a low speed immediately after its start. However, such variation is negligible relative to the automatic diaphragm control operation by the release plate 31 as a whole, since it is during said preliminary displacement that such speed variation occurs and has little influence upon the control result even when this is approximately looked upon as a linear variation. Therefore, tendencies of the respective lenses of three types are linearly shown. Straight lines extending in parallel to the axis of abscissa indicate the preliminary displacement quantities Lv of the release plate 31 until the diaphragm blades reach their positions corresponding to the fully opened diaphragm values of the respective lenses. With respect to the lens M in the diaphragm, if the release plate 31 is applied with a stoppage signal at a moment of a time $M_1$ elapsing after the release plate 31 has started, the diaphragm blades are actually stopped at a later moment $M_2$. Similarly, with the lens N, if the release plate 31 is applied with a stoppage signal at a moment $N_1$, the diaphragm blades are stopped at a later moment $N_2$ and, in the case of the lens $\theta$, the diaphragm blades are stopped at a later moment $\theta_2$ with a stoppage signal applied to the release plate 31 at a moment $\theta_1$. Accordingly, no matter which type the lens belongs to, there occurs a time delay from application of stoppage signal to actual stoppage of the diaphragm blades. This means that, to stop the diaphragm blades exactly at a moment corresponding to the desired diaphragm value, said stoppage signal must be applied to the release plate at a moment earlier than the desired moment of stoppage by such time delay Td due to the mechanical system or it would result in a stopping down in excess of the extent required for automatic diaphragm control.

The present invention addresses and provides a solution to this problem.

Referring again to FIG. 4, a quantity of stopping down achieved during the time delay Td due to the mechanical system depends upon the type of lens and such quantity can be substituted by the corresponding displacement quantity of the release plate 31 as follows:
Lens M—Lvm;
Lens N—Lvn; and
Lens $\theta$—Lv$\theta$.

It will be easily understood that the higher the speed of operation the lens has, the larger is the quantity of stopping down made after application of the stoppage signal.

Now, setting the circuit in the camera body for generation of the stoppage signal on the basis of the lens N having the average speed of operation, i.e., so that said circuit generates the stoppage signal earlier by a quantity Lvn with respect to the displacement quantity of the release plate 31 would result in actual quantities of stopping down:
excessive by Lvn−Lv$\theta$ for the lens $\theta$; and
insufficient by Lvm−Lvn for the lens M.

Thus, the corresponding errors of diaphragm control would prevent achievement of the proper exposure. Also uniformly setting Lv=Lvn on the basis of said preliminary displacement quantity Lv depending upon the fully opened diaphragm value of the lens N having the average speed of operation would result in diaphragm control errors corresponding to said deviations even when the lenses having the same fully opened diaphragm value, so far as their speeds of operation, are different due to the mechanical constructions peculiar to these lenses. Accordingly, the errors in quantities of stopping down corresponding to the respective time delays can be compensated independently of the gradient of characteristic line by setting the preliminary displacement quantities taking consideration of the time delays due to the mechanical systems of the respective types of lenses.

FIG. 6 shows the interconnection between diaphragm control magnet EEmg and release plate 31. Release plate 31 is guided by means not shown to move straight in accordance with movement of the pin 13 working in the camera body side. The position of a stop 40 in the path of release plate 31 varies from lens to lens and determines the LV value of the particular lens. Release plate 31 has teeth that mesh with teeth on a spur gear 41. An annular member having spur gear 41 and a ratchet 42 is guided for rotation by an annular guide member within the lens. The center of rotation of said annular member is indicated with a reference number 43 in FIG. 6. Said annular member having spur gear 41 and a ratchet 42 is provided with a lot of small holes for pulse counting. Said holes are arranged along the circumference with the center 43 of rotation as its center. A photo coupler PC consisting of a light emitting diode LED and a photo metric element PE' positioned opposite to each other is mounted and said holes made in an arcuate row pass between the light emitting diode and the photo metric element PE' forming a pair. When the ratchet 42 is moved by rotation of the release plate 31, pulse signals are generated by the rotation of said ratchet 42. Then, signals in proportion to Av'−Amax are taken out from the pulse counter 54, and said signals affect actual diaphragm control action through the comparison circuit. A pawl 44 prevents rotation of ratchet 42 in a counterclockwise direction as viewed in FIG. 6 and therefore also corresponding rotation of spur gear 41 and release plate 31 during the automatic exposure and shutter release operation. When the shutter is reset for the next photograph, pawl 44 is disengaged from ratchet 42 to permit release plate 31 to return to stop 40. Pin 13 and release plate 31 are located in the lens, and spur gear 41, ratchet 42, shaft 43, and pawl 44 are located in the camera body. A ratchet advancing tooth 45 is located in the camera body with magnet EEmg. Tooth 45 is mounted on the end of a magnetic pivot arm 46 biased into engagement with ratchet 42 by a spring 47. Magnet EEmg is wrapped around an armature 48 in proximity to pivot arm 46. Diaphragm control circuit $C_{14}$ includes a switch 49 and a battery 50 in series with magntic EEmg. Switch 49 is opened and closed responsive to comparator $C_{14}$. When switch 49 closes, as shown in FIG. 6, pivot arm 46 is drawn against armature 48, thereby disengaging tooth 45 from ratchet 42. When switch 49 opens, spring 47 pulls pivot arm 46 away from armature 48, thereby driving tooth 45 against ratchet 42 to advance it one increment. Swtich 49 is actuated by a relay control 52, such as a solenoid, which is driven by a pulse generator 53. Each time a pulse is supplied to relay control 52 by pulse generator 53, switch 49 opens to advance ratchet 42 one increment. Pulse generator 53 begins sending pulses to relay control 52 when shutter release is actuated and stops sending pulses to relay control 52 when comparator $C_{13}$ indicates equality between the two signals applied to its inputs.

Accordingly, displacement of ratchet 42, and thus blade actuating ring 11, is arrested responsive to comparator $C_{13}$, when the two signals applied to its input are equal.

Since the initial rotation of the diaphragm actuating ring, which corresponds to the preliminary displacement prescribed for the particular lens, does not result in any reduction of the aperture value, a number of the pulses stored in the counter do not correspond to actual reduction of the aperture value, but instead correspond to the characteristics of the particular lens, thereby providing compensation for different lens characteristics from lens to lens.

Figure 5:
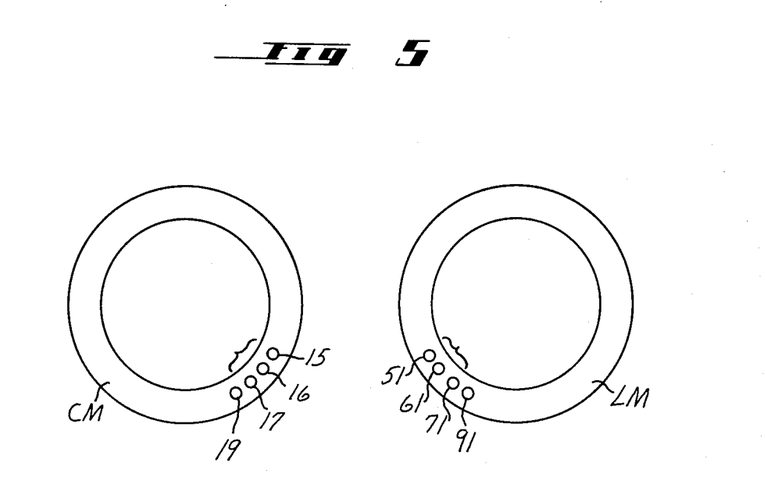
FIG. 5 is an elevation view illustrating a mount on the camera body for mounting the objective and a mount on the lens along their relative abutting plane.

With respect to the camera and the objective according to the automatic diaphragm control mode which is incorporated with the compensation for a difference in the fully opened diaphragm values of the respective lens interchangeably mounted on the camera and the compensation for a difference in the speeds of stopping down operation thereof, a preferred embodiment of the lens mounting arrangement by which the signal characterizing individual lenses are transmitted from the lens to the camera body is illustrated in FIG. 5.

Referring to FIG. 5, a portion designated by reference symbol CM corresponds to a mount on the camera for mounting of an objective while a portion designated by reference symbol LM corresponds to a mount on the lens. Both the mount CM on the camera and the mount LM on the lens are shown at their surfaces along which they are mutually abutted, namely, the mount CM is shown as seen from the camera front while the mount LM is shown as seen from the rear side of the lens. Both the mounts are provided with several pairs of opposed contact by which ON and OFF signals are transmitted in the form of binary codes and these contacts are sometimes utilized for carrying of the electric current depending upon various electrical factors such as resistance value which is, in turn, determined by the fully opened diaphragm value or the fully closed diaphragm value and other electrical quantities. According to the present invention, there are provided pairs of contacts 15 and 51, 16 and 61, and 17 and 71 through which the signals Amax depending upon said fully opened diaphragm value are transmitted from the lens to the camera body. These pairs of contacts are used as a part of the fully opened aperture signal member $C_{11}$ shown in FIG. 2. There are additionally provided a pair of contacts 19 and 91 through which the information on the fully closed diaphragm value depending upon individual interchangeable lenses mounted on the camera and on the automatic diaphragm control position (Auto) determined by said fully closed diaphragm value is transmitted from the lens to the camera body. It is through this pair of contacts that the ΔAmin signal determined by said fully closed diaphragm value is transmitted from the lens to the camera body. This pair of contacts constitutes a part of the fully closed aperture signal member $C_6$ shown in FIG. 2.

As will be obvious from the foregoing description in detail, the present invention enables an operation of stopping down at the highest precision by the automatic diaphragm control through the operation of stopping down which already includes therein the compensation by a simple mechanism of both the illumination intensity error in the film plane appearing due to the illumination intensity variation depending upon individual interchangeable lenses mounted on the camera and the illumination intensity error due to the position of the photometric element depending on various factors of this lens on one hand, and by providing the mechanism serving for stopping down with the preliminary displacement taking no part in the actual stopping down effect for the interchangeable lenses having their fully opened diaphragm values not covered by a particular series of multiple proportional values, the quantity of said preliminary displacement depending upon the individual one of these lenses not covered by said series, on the other hand. Concerning said preliminary displacement quantity, a delay occurring in the mechanical operation determined by the different speed of stopping down which depends, in turn, upon the individual lens interchangeably mounted on the camera is also considered and thereby said preliminary displacement quantity is further finely adjusted so that the automatic exposure control can be achieved with an extremely high precision including therein the effective compensation of the deviations caused by all the factors depending upon the individual lenses. In spite of achievement of such high precision exposure control, the present invention provides the desired interchangeable lens single-lens reflex camera of automatic exposure control type which is advantageously of simple and compact structure, of low cost and almost trouble-free.

What is claimed is:

1. A camera comprising:
   a camera body;
   a lens assembly insertable into the camera body, the lens assembly having a displaceable actuator and a diaphragm adjustable between a maximum aperture value and a minimum aperture value responsive to displacement of the actuator;
   means for generating a first signal representative of the displacement of the actuator;
   means for generating a second signal in the lens assembly, the signal being selected from a series of fully opened aperture values and representative of an approximate fully opened aperture value;
   means for connecting the second signal to the camera body;
   means in the camera body for generating a third signal representative of the desired aperture value of the diaphragm for correct exposure;
   means in the camera body for comparing the sum of the first and second signals with the third signal;
   means in the camera body for displacing the actuator upon shutter release;
   means responsive to the comparing means for arresting the displacement of the actuator when the sum of the first and second signals assume a predetermined relationship with the third signal; and
   means in the lens assembly for providing a difference between the approximate fully opened aperture value and the actual fully opened aperture value as a quantity of preliminary displacement which takes no part in stopping down the diaphragm for controlling the light quantity.

2. The camera of claim 1, additionally comprising means for maintaining the diaphragm at the maximum aperture value during an initial portion of the displacement of the actuator that defines the quantity of preliminary displacement.

3. The camera of claim 2, in which the diaphragm comprises a plurality of blades continuously rotatable responsive to displacement of the actuator, the blades together defining an opening decreasing in size during actuator displacement and the maintaining means comprises a ring masking the diaphragm blades during their rotation responsive to the intitial portion of the displacement of the actuator, the ring defining the maximum aperture value.

4. The camera of claim 2, in which the camera additionally has a lens for receiving light passing through the diaphragm and the third signal generating means comprises a photometric element positioned to receive light passing through the lens, the photometric element producing a light quantity representative signal, and means for logarithmically compressing the light quantity representative signal, and means for modifying the compressed signal to reflect the desired shutter speed and film sensitivity.

5. The camera of claim 4, in which the diaphragm, lens, and first signal generating means are disposed in the lens housing.

6. A camera comprising:
a camera body;
a plurality of lens assemblies interchangeably insertable into the camera body, each lens assembly having a displacable actuater and a diaphragm adjustable responsibe to displacement of the actuater, the diaphragm having an automatic diaphragm value, a minimum diaphragm value, a maximum diaphragm value, and an Av diaphragm value representative of the difference between the automatic diaphragm value and the minimum diaphragm value;
means for generating in the inserted lens assembly a first signal representative of unity plus the difference between its Av diaphragm value and that of a reference lens;
means for generating in the inserted lens assembly a second signal representative of the difference between its minimum diaphragm value and that of a reference lens;
means for generating in the inserted lens assembly a third signal representative of its maximum diaphragm value;
means for coupling the first, second, and third signals from the inserted lens assembly to the camera body;
means in the camera body for generating a fourth signal representative of the desired diaphragm value for correct exposure;
means for generating a fifth electrical signal representative of the displacement of the actuator of the inserted lens assembly;
means for comparing the fourth and fifth signals;
means for displacing the actuator from the automatic diaphragm value of the inserted lens assembly upon shutter release; and
means responsive to the comparing means and the first, second, and third signals for arresting the displacement of the actuator when the fourth and fifth signals assume a predetermined relationship determined by the first, second, and third signals.

* * * * *